United States Patent [19]
Imai et al.

[11] Patent Number: 5,379,368
[45] Date of Patent: Jan. 3, 1995

[54] PRINTING CONTROL METHOD AND APPARATUS

[75] Inventors: Tuneo Imai, Ebina; Nobumitsu Kembo; Toshiyuki Yamada, both of Hadano; Takashi Wakabayashi, Fujisawa, all of Japan

[73] Assignees: Hitachi, Ltd., Tokyo; Hitachi Computer Engineering Co., Hadano, both of Japan

[21] Appl. No.: 797,318

[22] Filed: Nov. 25, 1991

[30] Foreign Application Priority Data

Nov. 30, 1990 [JP] Japan .................. 2-335550

[51] Int. Cl.⁶ ........................... G06F 15/00
[52] U.S. Cl. .................. 395/117; 395/101
[58] Field of Search ......... 395/101, 115–116, 395/117, 135, 112, 146, 148; 400/63, 68, 76; 358/452, 540

[56] References Cited

U.S. PATENT DOCUMENTS

| | | | |
|---|---|---|---|
| 4,675,844 | 6/1987 | Yasuda et al. | 395/115 |
| 4,944,614 | 7/1990 | Tanaka | 400/68 |

FOREIGN PATENT DOCUMENTS

| | | |
|---|---|---|
| 0131966 | 1/1985 | European Pat. Off. . |
| 0167166 | 1/1986 | European Pat. Off. . |
| 2550268 | 5/1978 | Germany . |
| 3233510 | 3/1986 | Germany . |
| 3922276 | 1/1990 | Germany . |

*Primary Examiner*—Arthur G. Evans
*Attorney, Agent, or Firm*—Kenyon & Kenyon

[57] ABSTRACT

A printing control method and apparatus for combining forms data and printing data to produce and output printing images. Forms data are handled as a group of forms data including a plurality of component data groups forming partial form elements and component placement information groups specifying intra-page positions of components. For form selection, component placement selection information is selected in the printing data. Component placement information selected and indicated by this component placement selection information is used for form generation. If a plurality of components are the same in partial form elements, therefore, a plurality of kinds of forms data can use components in common and are administered by only component placement information specifying intra-page positions of respective components. As for forms data needed at the time of printing, therefore, components of form elements are placed and combined in accordance with the component placement information. Combined forms data thus generated and printing data are converted into printing images and outputted. As a result, there are obtained a printing control method and apparatus in which forms data are administered efficiently and used effectively.

12 Claims, 7 Drawing Sheets

PRINTING CONTROL METHOD AND APPARATUS

BACKGROUND OF THE INVENTION

The present invention relates to a printing control method, and apparatus, and in particular to a printing control method, and apparatus, for efficiently administering a plurality of forms data to allow effective use in exercising printing control for producing image data of printing images from printing data by using forms data.

In exercising printing control for producing image data of printing images from printing data by using forms data in the prior art, forms data are prepared beforehand and a printing control apparatus combines the forms data with the printing data to produce image data of printing images. In a slip printing method for performing printing on slips, chits or the like by using forms data, only a partial forth amendments such as processing of deleting ruled line data included in forms data in response to printing data for the purpose of making printed matter easy to see as described in JP-A-1-246627, for example, are possible. However, overall amendments of the form such as placement changes of ruled line frames or head characters are impossible. That is to say, partial amendments of the form are possible at the time of printing, but overall amendments of the form such as placement changes of ruled line frames or head characters are impossible.

SUMMARY OF THE INVENTION

In slip printing control for performing form document printing on slips by using forms data as in the above described prior art, placement changes of ruled line frames or head characters are impossible. If placement of partial components such as head characters or ruled line frames needs to be changed, for example, forms data with completely the same components data as those before the change, other than data of those components to be changed, had to be newly produced to accomplish the desired change. Furthermore, if placement of components on a page was to be changed even if the shapes and sizes of individual components (such as ruled line frames or head characters) placed on the printing page did not need to be changed, new forms data with in allotment of data for components whose placement is to be changed had to be produced. That is to say, a change of a component or placement in forms data meant completely remaking forms data. Therefore, the efficiency of form change processing is low. Furthermore, fortes data resources attendant upon storing successively each form change made, results in reduced efficiency of the storage device of the system.

An object of the present invention is to provide a printing control method, and apparatus, for efficiently administering a plurality of forms data to allow effective use in exercising printing control for producing image data of printed images from printing data by using forms data.

Another object of the present invention is to provide a printing control method, and apparatus, whereby printed matter having different component displacement can be obtained from one forms data without replacing the forms data.

Still another object of the present invention is to improve the efficiency of form change processing, reduce the capacity of forms data within the system, and improve the use efficiency of the storage device of the system.

In form document printing control for selecting a plurality of kinds of forms used as the form document at the time of printing, combining those forms with printing data, and outputting printing images, a printing control method and apparatus according to the present invention for achieving the above described objects may provides a group of forms data including components placement information specifying a plurality of components, which are partial form elements, and placement of components on a page as forms data, placing and combining, at the time of printing, form elementary components included in the group of forms data on the basis of component placement selection information, i.e., form selection information, and generating combined forms data.

Thereby forms data are handled as a group of forms data including a plurality of groups of component data which are partial form elements and a group of component placement information pieces specifying placement of components within a page. If a plurality of components which are partial form elements are the same in a plurality of kinds of forms data, therefore, components can be used in common and components are administered by only the component placement information specifying placement of respective components within a page. Therefore, forms data needed at the time of printing is derived by placing and combining components, which are elements of the form, in accordance with component placement information and outputted as forms data.

Forms data are thus handled as a group of forms data by providing a hierarchical structure. One hierarchy is foiled by a group of component data for generating components such as head characters or ruled line frames which can be handled as one collection within a slip. The other hierarchy is formed by a group of component placement information pieces of intra-page placement for specifying how components included in the slip are placed in each page. In printing data for selecting a form, component placement selection information for selecting and indicating component placement information is provided. Each printing data selects component placement information on the basis of its own component placement selection information. Therefore, combination and placement are determined for each of the components included as forms data, and components printed by printing data are used in common.

In exercising form document printing control including the steps of selecting a plurality of kinds of forms data used as form documents at the time of printing, combining those forms data with printing data, and outputting printing images, a plurality of kinds of forms data in use are administered efficiently and can be used effectively. Further, in case printed matters having different component placements are to be obtained from one forms data, it is sufficient to prepare a plurality of component placement information pieces so that they may differ only in component placement information, and printing control can be exercised without replacing forms data. Even in processing of changing the form, it is sufficient to prepare only the component placement information to be converted, resulting in an improved efficiency of form change processing. Further, even in case of a plurality of forms, only the component placement information is needed and hence the capacity of forms data within the system can be reduced, resulting in an improved use efficiency of the storage device of the system.

BRIEF DESCRIPTION THE DRAWINGS

DESCRIPTION OF THE PREFERRED EMBODIMENTS

Hereafter, an embodiment of the present invention will be described concretely by referring to drawings.

Figure 1:
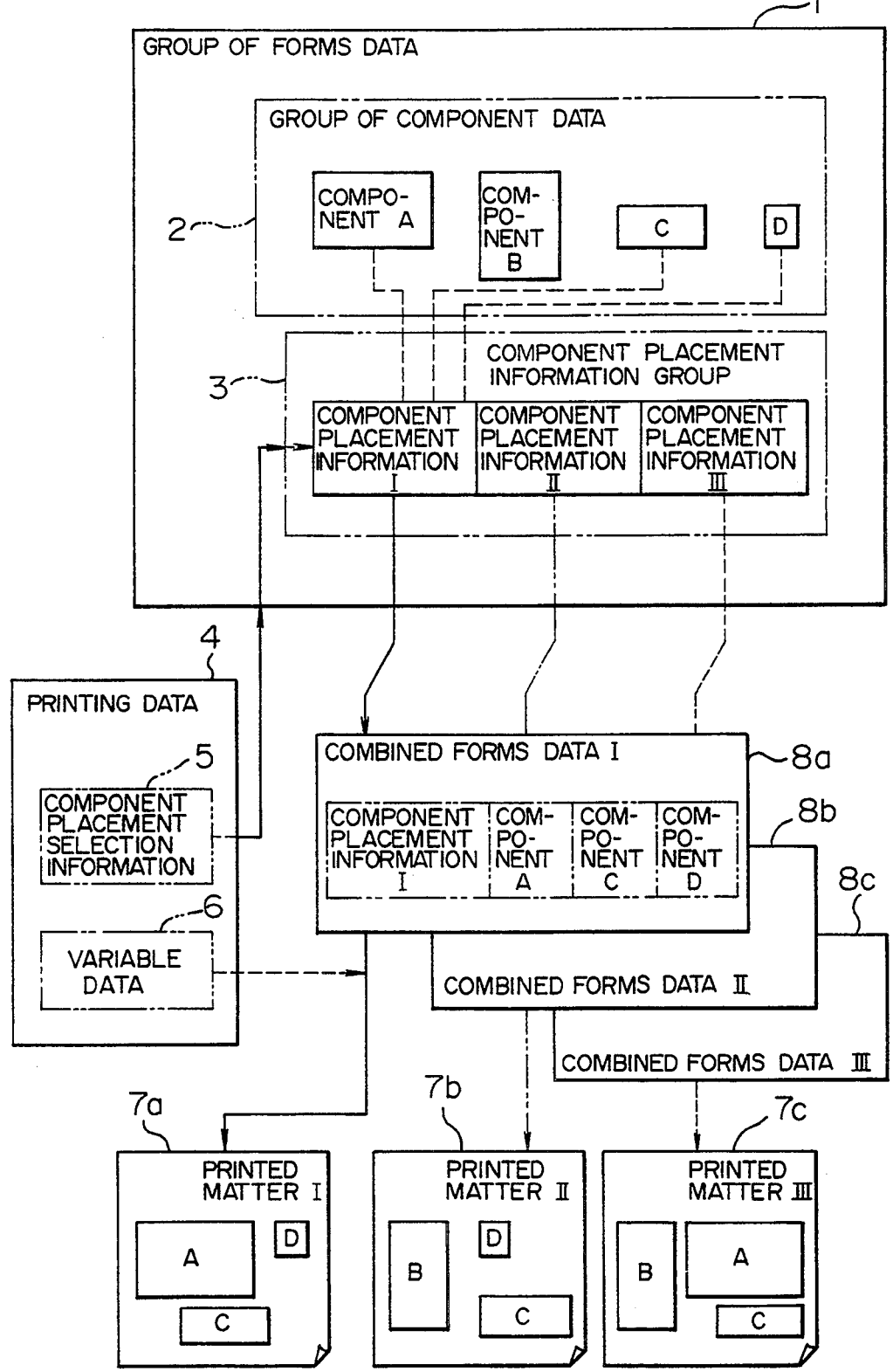
FIG. 1 is a block diagram for illustrating a printing control method according to an embodiment of the present invention.

FIG. 1 is a block diagram showing the configuration of a printing form administration system according to an embodiment of the present invention. In form printing control using forms data and printing data, the block diagram of FIG. 1 shows the flow of entire processing for selecting and indicating a kind of printed matter on the basis of the printing data, exercising printing control by using the forms data, and obtaining printed matter.

With reference to FIG. 1, numeral 1 denotes a group of forms data, 2 a group of component data, and 3 a group of component placement information pieces. Numeral 4 denotes printing data, 5 component placement selection information, and 6 variable data. Further, 7a denotes a printed matter I, 7b a printed matter II, 7c a printed matter III, 8a combined forms data I, 8b combined forms data II, and 8c combined forms data III.

The forms data group 1 includes the component data group 2 and the component placement information group 3. The component data group 2 includes respective component data (such as component A, component B, component C and component D), which are form elements of forms data. The component placement information group 3 includes component placement information (such as component placement information I, component placement information II, and component placement information III) for combining respective components forming form elements of the forms data and specifying intra-page position of respective components. As for component placement information, a plurality of component placement information pieces (component placement information I, component placement information II, and component placement information III) are so provided as to correspond to combined forms data (combined forms data I, combined forms data II, and combined forms data III) respectively having needed component placements.

In order to perform form document printing; component placement selection information 5 and variable data 6 are provided in the printing data 4. If desired component placement information I is selected by selection and specification based upon the component placement selection information 5 of the printing data 4, combined forms data I (8a) is formed by combining the component placement information I with component data (component A, component C, and component D) needed by that component placement information I. By using the combined forms data I (8a) thus formed, form document printing control is exercised together with the variable data 6 of data to be printed. Printing is performed in accordance with allocation information for individual components included in the component placement information I.

As a result, there is obtained the printed matter I (7a), on which the component A, the component C, and the component D are disposed in predetermined positions of the page, and the variable data 6 is printed. By only changing the selection specification of the component placement selection information 5 of the printing data 5 in this case, the component placement information II is selected and the combined forms data II (8b) is formed, resulting in the printed matter II (7b) having different components and placement. If the component placement selection information 5 selects the component placement information III in the same way, the combined forms data III (8c) is formed and the printed matter III (7c) having different components and placement is obtained.

By only thus changing the kind of component placement information selected and indicated by the component placement selection information 5 which is form selection information included in the printing data 4, the component placement or the component combination can be changed without changing forms data at all.

Each component data (the component A, component B, component C, and component D) included in the combined forms data is data for generating components which are formed by ruled lines, character data, or the like and which can be handled as one collection in the forth in the same way as the component data group 2. Further, component data may include graphic data and picture data.

Further, the combined forms data includes component placement information prescribing how respective components generated by respective component data are disposed on the page. For obtaining three kinds of different printed matters I to III from one forms data group I, for example, the forms data group 1 includes the component placement information I to the component placement information III prescribing placement of components in respective printed matters and the component data (the component A, component B, component C and component D) needed by respective component placement information pieces. As for the number of component data used in common by respective component placement information pieces in this case, one will suffice. Component data used by respective component placement information pieces need not be so provided as to correspond to the component placement information I to the component placement information III.

Individual component data are independent of each other. Even if components are moved in the page, the relative positional relation of internal data of components such as ruled line frames remains unchanged and other components are not influenced by it. In case of characters, for example, allocation coordinates of character data included in component data are specified as relative coordinates for allocation data in components from the allocation origin. Therefore, necessary component data and necessary component placement information are included in the forms data group 1. By only selecting and indicating, at the time of printing, component placement information specified by component placement selection information included in the printing data, which is to be used by component placement information included in that forms data, component placement and component combination of printed matter can be changed.

Figure 2:
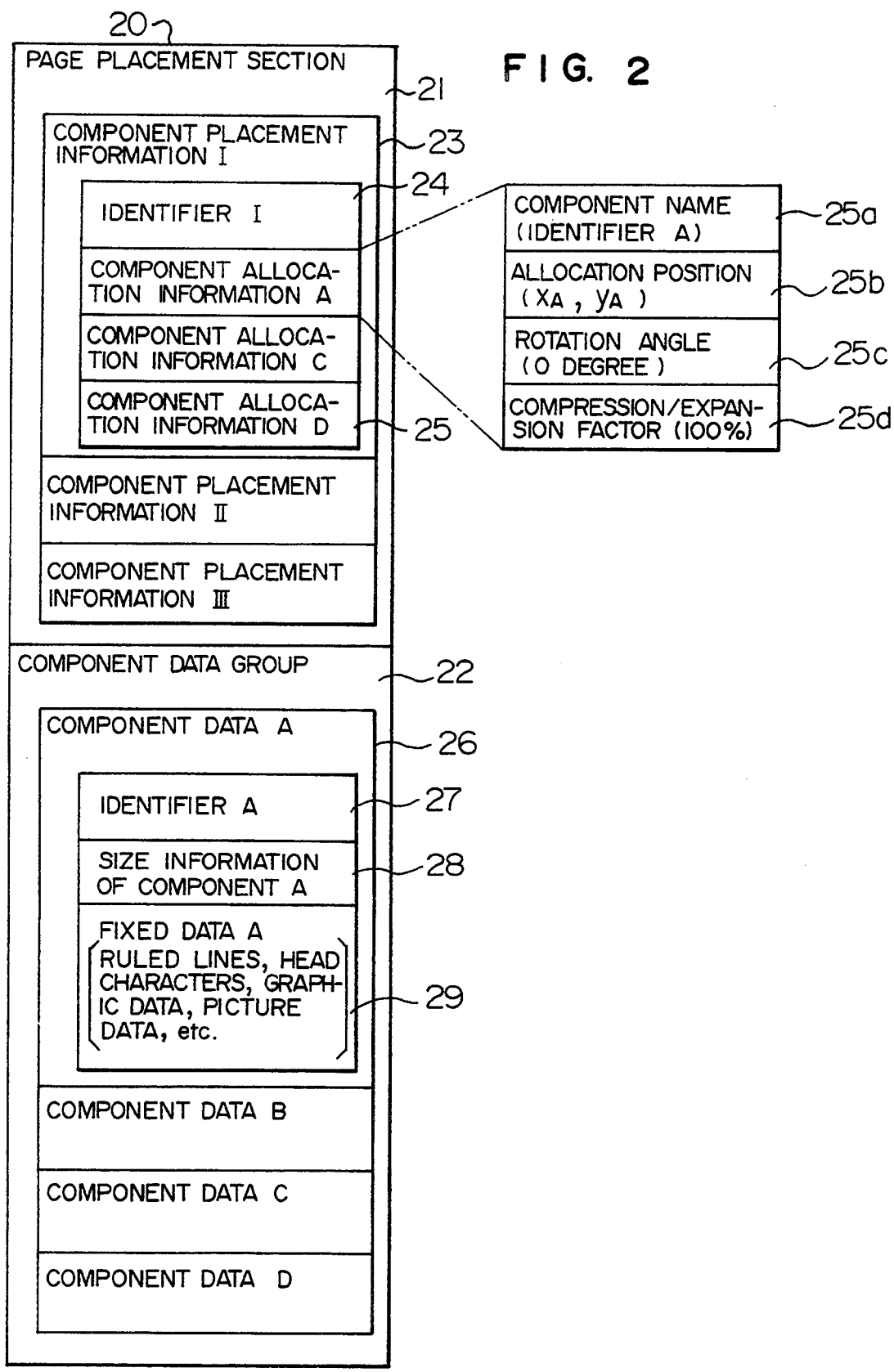
FIG. 2 is a diagram illustrating an example of a group of forms data for specifying a plurality of forms.
Figure 3:
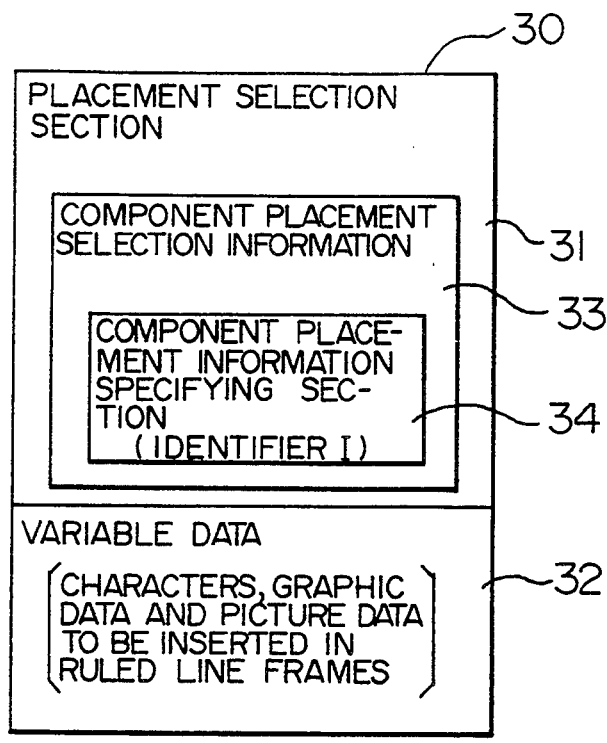
FIG. 3 is a diagram illustrating an example of printing data using the group of forms data shown in FIG. 2.

FIG. 2 is a diagram illustrating an example of a group of forms data capable of coping with a plurality of forms. FIG. 3 is a diagram showing an example of printing data using the group of forms data shown in FIG. 2.

As shown in FIG. 2, a group of forms data 20 includes a page placement section 21 and a group of component data 22. In the page placement section 21, component placement information 23 of respective printing page is included. Herein, component placement information I to component placement information III are provided as the component placement information 23. In the component data group 22, component data A to component data D respectively generating respective components are provided as the component data 26. The component data A includes an identifier 27 for discriminating itself from other component data, shape data 28 concerning the shape of that component such as the component size, and fixed data 29. Herein, the fixed data 29 refers to characters, figures, picture data, etc. used as fixed form like ruled lines and head characters, and it refers to fixed data A to be printed in the component A. Further, allocation of the fixed data 29 in the component A is specified by relative specification for allocation data in the component A from the allocation origin. Thereby the fixed data A is fixed with respect to the component A. Even if movement or rotation is performed in the page with respect to the component A, therefore, the fixed data A moves or rotates together with the component A and alteration such as data amendment of fixed data A attendant upon it is not present. In the same way, each of the component data B, component data C, and component data D has an identifier 27, shape data 27, and fixed data 29 for the component.

Together with an identifier 24, component allocation information 25 prescribing component placement for respective components needed to print printed matter is provided in the component placement information 23. In the component placement information I for printing the printed matter I, for example, component allocation information A, component allocation information C, and component allocation information D indicating placement allocation of respective components for the component A, component C, and component D are provided together with an identifier I specified when the component placement information to be used in the printing data is selected and indicated.

The component allocation information 25 includes information such as a component name 25a indicating a component provided by it in the allocation information, an allocation position 25b of the component in the page, a rotation angle 25c of the component from the erect state at the time of page allocation, and a compression/expansion factor 25d of the component at the time of page allocation. If the component allocation information A is so specified as to have component A as the component name 25a by specification of identifier A, $(x_A, Y_A)$ as the allocation position 25b of the component A, 0 degree as the rotation angle 25c, and 100% as the compression/expansion factor 25d, the component A is allocated to a predetermined position of the printed matter I as shown in FIG. 4.

Figure 4:
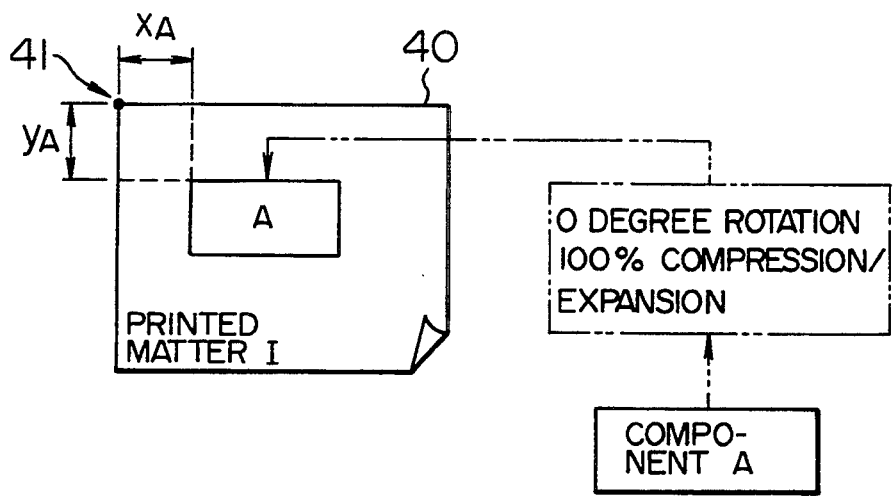
FIG. 4 is a diagram illustrating manipulation for allocating components into a page of printed matter in accordance with component allocation information.

FIG. 4 is a diagram illustrating manipulation for allocating components into a page of printed matter in accordance with the component allocation information. As shown in FIG. 4, allocation is performed so that the leftmost top end of the component A may be positioned in an allocation position relatively specified with the leftmost top end of a printed matter 40 defined as a page origin 41. In this case, placement is conducted by carrying out shape manipulations of rotation angle and compression/expansion factor. By way of example, it is now assumed that the allocation information A is specified as follows.

Allocation position: $(x_A, Y_A)$
Rotation angle: 0 degree
Compression/expansion factor: 100%

Allocation is performed on the printed matter I so that the leftmost top end of the component A may be positioned in a position having coordinates $(x_A, Y_A)$ from the page origin 41 located at the leftmost top end of the printing page. Since the shape manipulation for the component A is 0 degree in rotation angle and 100% in compression/expansion factor, the component A is so disposed as to be erected with its size unchanged.

In order to indicate the form to be used when the printing data is printed, printing data 30 includes a placement selection section 31 for indicating placement of the component in the page included in the forms data group (20 of FIG. 2) and variable data 32 including characters, figures and picture data to be so printed as to be inserted into ruled line frames of respective components of the forms data, as shown in FIG. 3. In the placement selection section 31, a component placement selection information 33 for selecting and indicating component placement information to be used for printing is provided. Herein, an identifier I is specified by a component placement information specification section 34 as the component placement selection information 33. Thereby, selection of the component placement information having the same identifier I in the forms data group (20 of FIG. 2) is indicated.

Operation of the processing for printing the printed matter I will now be described briefly by referring to the forms data group (20 of FIG. 2) and the printing data (30 of FIG. 3).

The printing data 30, which has specified the identifier I in the component placement selection information 33 in the placement selection section 31, is printed in accordance with the component placement information I, which has specified the identifier I in the page placement section 21 in the forms data group 20. In the component placement information I, the component allocation information A, the component allocation information C and the component allocation information D, which have respectively specified the identifier A, the identifier C and the identifier D in the field of the component name 25a, are included. This means that the component A, the component C and the component D are used when the printed matter is printed.

The component A is generated by the component data A specified by the identifier A in the component data group 22 of the forms data group 20. The component data A is allocated to the page of the printed matter I in accordance with the indication of the allocation position 25b, the rotation angle 25c and the compression/expansion factor 25d included in the component allocation information A, which has specified the identifier A in the component name 25a of the component placement information I. With respect to the component C and the component D as well, allocation is performed by similar manipulations. That is to say, the component C is allocated to the page in accordance with the component allocation information, C, and the component D is allocated to the page in accordance with the component allocation information D.

Further, the variable data 32 within the printing data 30 is allocated to a predetermined position of the pertinent page in accordance with respective allocation specifications.

In case the printing data 30 is to be printed by such manipulations, the component placement information I of the forms data 20 is selected and specified by the component placement selection information 33 specified by the printing data 30. The component placement information I selects the component A, the component C and the component D, which are form elements in form printing, and specifies placement positions of them. Together with the variable data 32 of the printing data 30, therefore, the component A, the component C and the component D are placed in predetermined positions of the page. The printed matter I is thus obtained.

Figure 5:
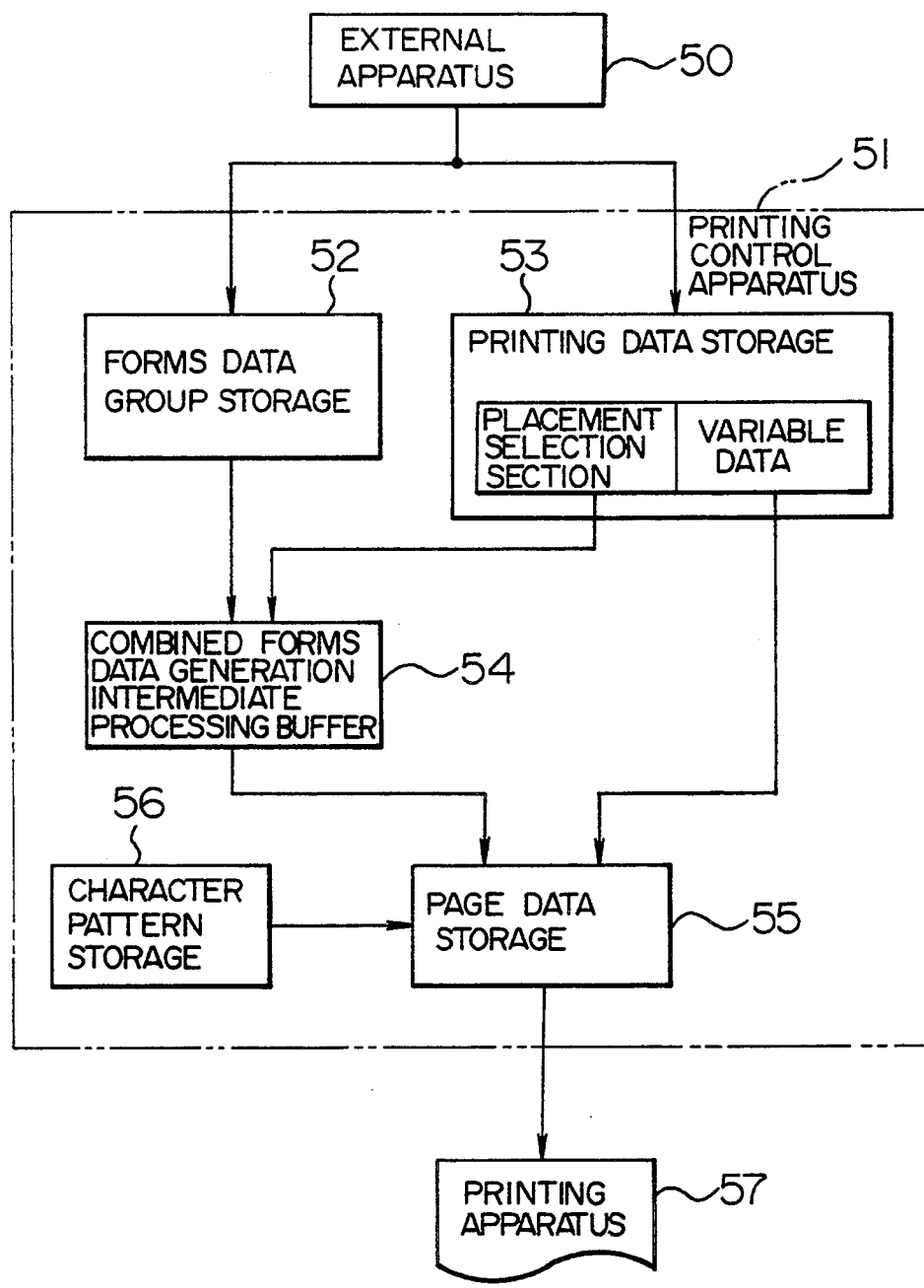
FIG. 5 is a diagram showing the configuration of a principal part of a printing control apparatus according to the present invention.

FIG. 5 is a block diagram showing the configuration of a principal part of a printing control apparatus exercising printing control according to the present invention. In FIG. 5, numeral 50 denotes an external apparatus, 51 a printing control apparatus, 52 a forms data group storage, 53 a printing data storage, 54 a combined forms data generation intermediate processing buffer, 55 a page data storage, 56 a character pattern storage, and 57 a printing apparatus.

Printing control operation performed in the printing control apparatus 51 will now be described in brief. The printing control apparatus 51 receives the forms data group from the external apparatus 50 and stores it into the forms data group storage 52. Thereafter, the printing control apparatus 51 receives printing data and stores it into the printing data storage 53. Thereby printing operation is started. In the forms data group stored in the forms data group storage 52, component data and component placement information required to obtain a plurality of kinds of printed matter are mixed together. In accordance with the component placement selection information included in the placement selection section of printing data stored in the printing data storage 53, the combined forms data generation intermediate processing buffer 54 selects component placement information from the forms data group stored in the forms data group storage 52, thus performs intermediate processing of selecting component data for the pertinent page (for one printed matter), and stores the component placement information and component data together. The component placement information and component data forming the combined forms data for one page taken as the unit stored in the combined forms data generation intermediate processing buffer 54 are supplied to the page data storage 55, combined with variable data stored in the printing data storage 53, further converted into a dot pattern, and then stored into the page data storage 55. Into the page data storage 55, dot pattern data for printed matter are stored by taking a page as the unit. In converting character data to a dot pattern, for example, at this time, the character pattern storage 56 is referred to. Lastly, dot pattern data of the printed matter stored in the page data storage 55 are transferred to the printing apparatus 57. By a printing mechanism in the printing apparatus 57, dot pattern data are printed on paper. The printed matter is thus obtained.

By thus providing the combined fortes data generation intermediate processing buffer 54, generating forms data having a combination of component placement information and component data, and generating dot pattern data corresponding to printed matter for one page by using the combined forms data, and number of accesses to the forms data group storage 52 for the purpose of searching component data can be reduced, resulting in a higher efficiency of form printing processing.

Figure 6:
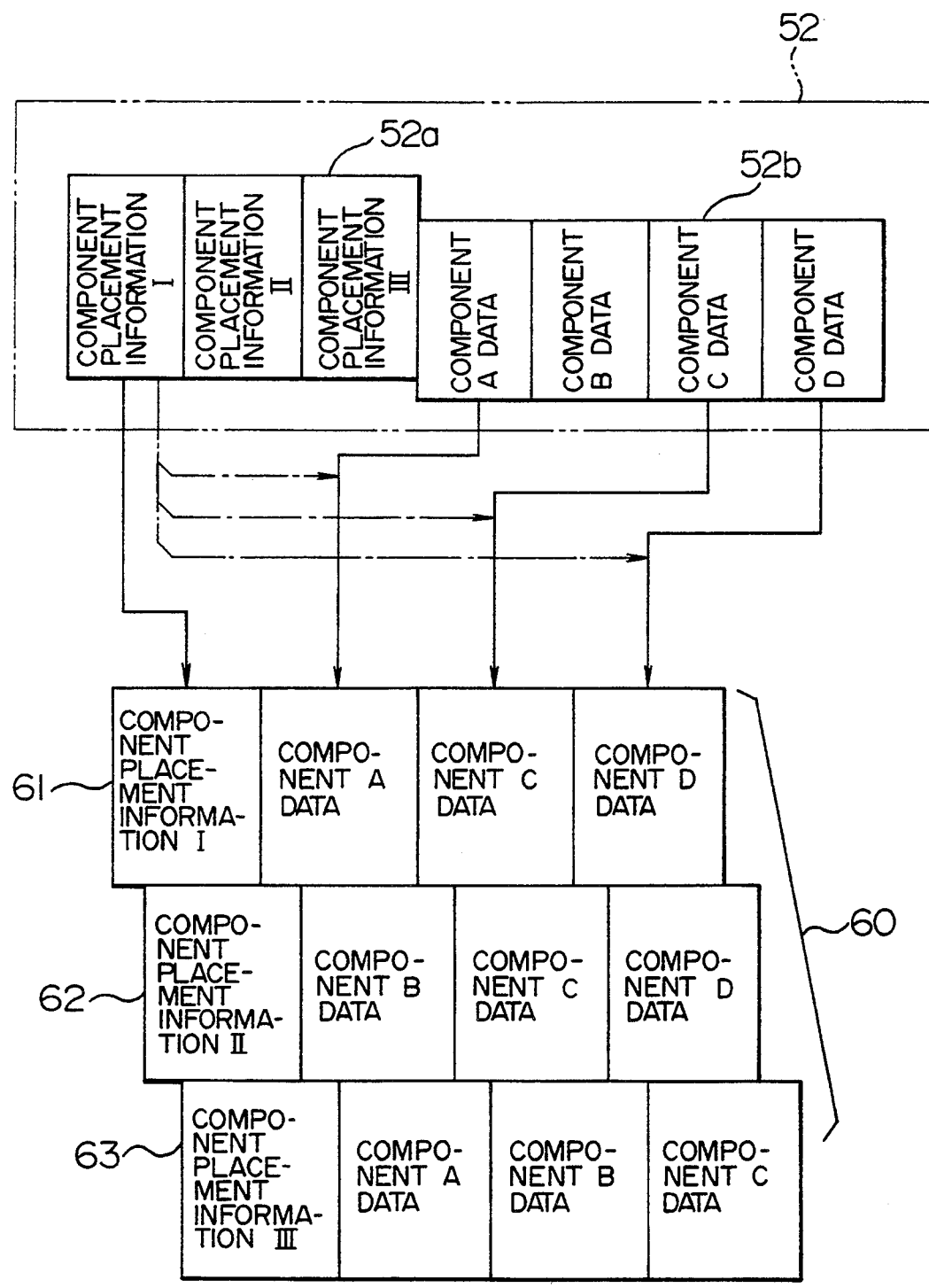
FIG. 6 is a diagram illustrating processing of generating combined forms data in a combined forms data generation intermediate processing buffer.

FIG. 6 is a diagram illustrating generation processing of combined forms data in the combined forms data generation intermediate processing buffer. In order to cope with a plurality of kinds of forms, three kinds of component placement information, i.e., component placement information I, component placement information II and component placement information III are already stored in the forms data group storage 52 as component placement information 52a. Further, as component 52b selected by them, four kinds of component data, i.e., component A data, component B data, component C data and component D data are already stored.

In the combined forms data generation intermediate processing buffer, combined forms data 60, which has component placement information 52a associated with component data 52b and which has already been subjected to intermediate processing, is synthesized and stored. This combined forms data 60 is formed by taking printed matter for one page of each page as the unit. For example, combined forms data corresponding to the printed matter I is prescribed by the component placement information I. However, each component data such as component A data, component C data or component D data so selected and specified by the component placement information I as to be used is combined with the component placement information I and stored as combined forms data 61. In the same way, combined forms data 62 for the printed matter II has a combination of the component placement information II, the component B data, component C data and component D data. Combined forms data 63 has a combination of the component placement information III, the component A data, component B data and component C data. The combined forms data 62 and the combined forms data 63 are stored.

Instead of respective component data themselves, storage addresses of component data in the forms data group storage (52 of FIG. 5) may be combined in the combined forms data 60. Thereby the amount of data is reduced. Which components are to be used for the printed matter I is determined by identifiers of component names specified in the component placement information I. When dot patterns are to be generated by taking a page as the unit, combined forms data 60 stored in the combined forms data intermediate processing buffer are consecutively processed by taking a page as the unit.

In printing the component placement information and component data, this eliminates processing of referring to the forms data group storage and improves the efficiency of form printing processing.

Variants of the printing control method according to the present embodiment and other embodiments will now be described. First of all, a variant in which variable data are associated with individual component data included in the forms data will be described.

Figure 7:
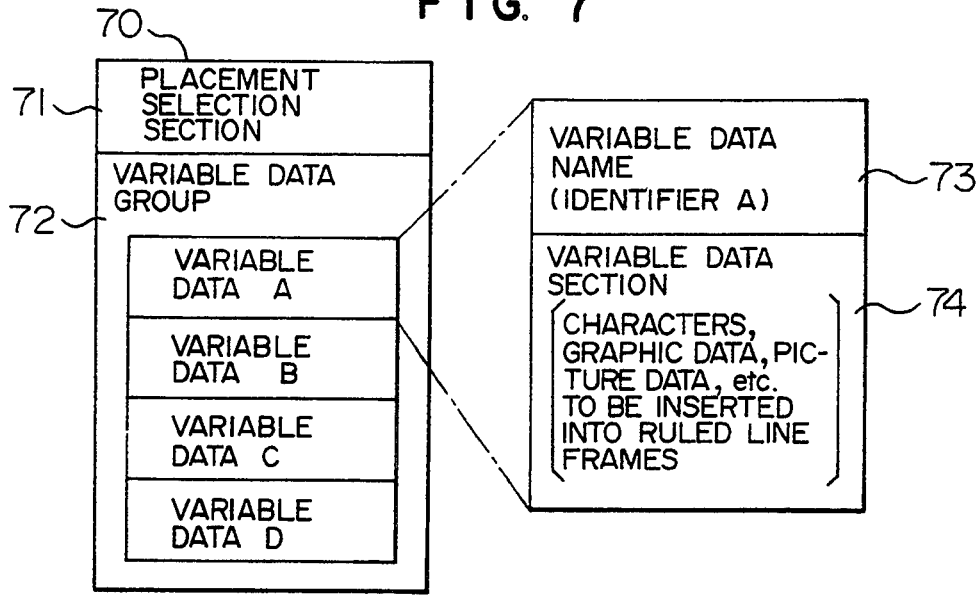
FIG. 7 is a diagram showing an example of a data structure in case variable data are so set as to correspond to individual component data included in forms data.

FIG. 7 is a diagram showing an example of a data structure in case variable data are so set as to be associated with individual component data included in the forms data.

In printing data 70, a placement selection section 71 for specifying component placement of the form and a variable data group 72 serving as variable data are provided. The variable data group 72 can be so configured that variable data segment A, variable data segment B, variable data segment C and variable data segment D (hereafter simply referred to as variable data A, B, C and D, respectively) respectively associated with component data of the forth may be set as respective data segments of the above described variable data group 72. In this case, individual variable data A corresponding to the component A, for example, has a variable data name 73 and a variable data section 74 which is a variable data main body section. In the variable data name 73, an identifier A indicating the association with the component A, for example, is specified. In the variable data section 74, data including characters, graphic data and picture data to be inserted into fixed data A (29 of FIG. 2) such as ruled line frames in the component A are set.

As for allocation specification of variable data A herein, the variable data A is so allocated as to correspond to the component A. In the same way as the allocation of the component A, therefore, allocation is specified by relative position specification from the origin located at the leftmost top end. In this case, the origin of allocation is located at the leftmost top end of the region in the component A.

Figure 8:
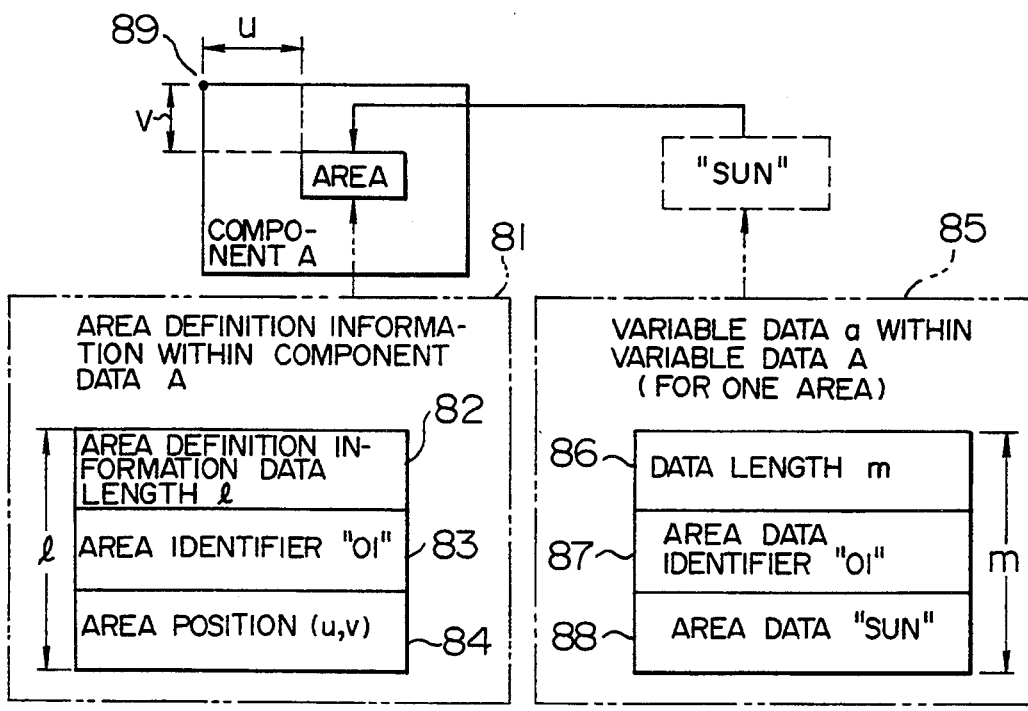
FIG. 8 is a diagram illustrating an example of a technique for allocating variable data a in a component A.

FIG. 8 is a diagram illustrating an example of a technique for allocating variable data a in the component A.

In this example, information of an area for allocating individual variable data a to the inside of the component A is included in the component data A. In this case, area definition information 81 defining an area for allocating characters, graphic data, picture data, etc. included in the variable data A is so provided as to be included in the component data A as shown in FIG. 8. In the area definition information 81, an area definition information data length 82 for indicating the data length of data defining one area, an area identifier 83 for associating data ("sun" shown in FIG. 8) allocated to the inside of that area with the area, and an area position 84 for specifying an allocation position within the area component are included. In data 85 for one individual area included in the variable data a, there are set a data length 86 indicating the data length of data allocated to that area, an area identifier 87 for associating an area to be allocated with area data, and area data ("sun") 88 to be allocated to the area. At the time of printing, the area data 88 having the same area data identifier 87 as the area identifier 83 of the area definition information 81 is allocated to the inside of the component in accordance with relative position coordinate values (u, v) of the area position 84.

Specifying of the area position is a relative specifying with respect to the allocation data included in the component A from the allocation origin 89. Even if selection and indication of component placement information are changed with the component placement selection info,nation included in the printing data and the allocation position of the component in the page is changed, therefore, it is not necessary to change the allocation specifying of the variable data a to be printed in the component.

Figure 9:
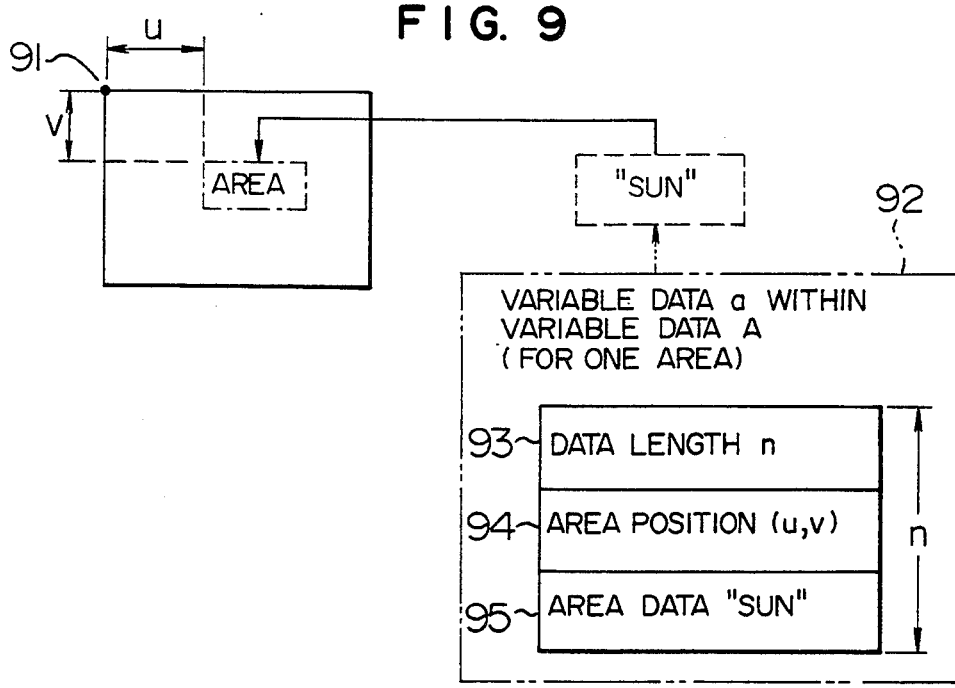
FIG. 9 is a diagram for illustrating another example of the technique for allocating the variable a in the component A.

FIG. 9 is a diagram illustrating another example of a technique for allocating variable data a in the component A.

In this example, information of an area for allocating individual variable data a to the inside of the component A is included in the variable data A. In this case as well, allocation specifying of variable data a is performed by a relative specifying of the component A from the allocation origin 91. The variable a includes a data length 93 for indicating the data length of data 92 for one area allocated to that area, an area position 94 for specifying the allocation position in the component of the area, and area data 95 allocated to the area. In this case as well, the variable data a is specified relatively in the component A in the same way as the case of FIG. 8. Even if the allocation position of the component in the page is changed, therefore, it is not necessary to change the allocation specifying of the variable data a. Therefore, each component data can be handled independently.

As described with reference to the above described embodiment, printing data includes a placement selection section for specifying and component placement of the form and a variable data group serving as variable data. In this case, a plurality of forms can be specified by providing a plurality of placement selection information pieces in the placement selection section of the printing data. Further, by making each component placement selection information include specification of the number of copies, printing control with the specified number of sheets of printed matter for each form can be exercised.

Figure 10:
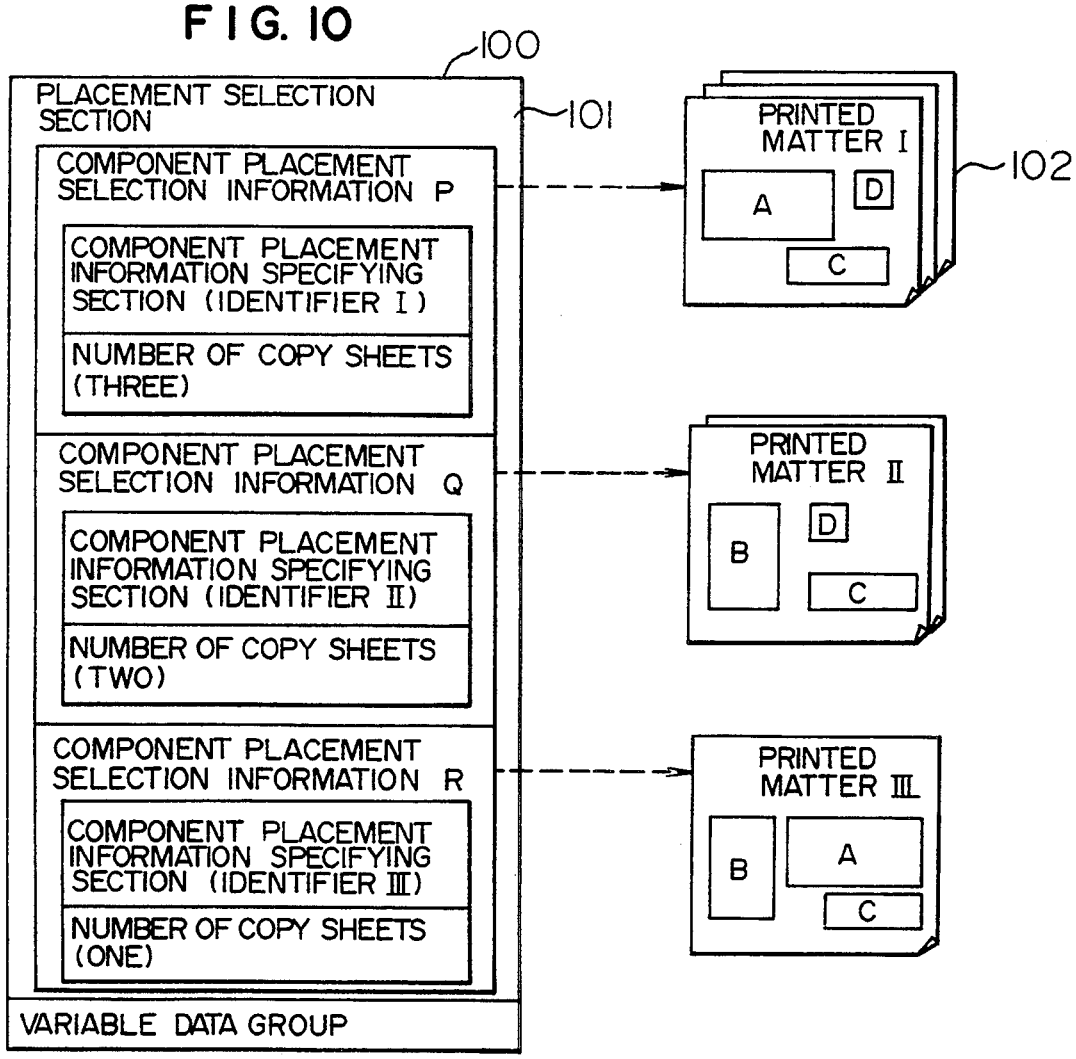
FIG. 10 is a diagram showing an example of printing data setting in case printing control with the number of printed matters so specified as to correspond to respective forms is exercised.

FIG. 10 is a diagram showing an example of printing data setting in case printing control is exercised with the specified number of sheets of printed matter for each form. FIG. 10 shows an example of printing data setting performed in case printing control is exercised under the condition that the number of sheets is 3 for the printing matter I, 2 for the printed matter II, and 1 for the printed matter III, and combined forms data are specified by respective component placement information pieces and component data of common form element. In order to obtain respective printed matters shown in the right half of FIG. 10, component placement selection information P, component placement selection information Q, and component placement selection information R are set in a placement selection section 101 of printing data 100. The component placement selection information P specifies an identifier I in a component placement information specifying section for specifying which component placement information in the forms data group is to be used and specifies that the number of copies be 3 when that component placement information is used. Thereby three sheets 102 are printed for the printed matter I. That is to say, the component placement information I is used as a result of specifying in the identifier I and printing is performed with the number of copy sheets defined as three. As for the printed matter II and the printed matter III as well, component placement information is specified in accordance with an identifier II of component placement selection information Q and an identifier III of component placement selection information R, respectively, and printing is performed with respective numbers of copy sheets. In this way, a plurality of component placement selection information pieces including specifying of the numbers of copy sheets are set in the placement selection section 101 within the printing data 100 and processed successively. As a result, a plurality of printed matters can be printed with respective desired numbers of copy sheets so long as the printing control apparatus receives one printing data once.

Heretofore, the present invention has been concretely described by referring to embodiments. However, it is a matter of course that the present invention is not limited to the above described embodiments, but various changes can be made without departing from the true spirit of the invention.

In accordance with the present invention as heretofore described, a group of forms data for specifying the printing form includes component data of components of form elements and component placement information prescribing placement of respective components, and combined forms data is obtained by selecting and specifying only component placement information by means of printing data, printing being made possible. In this case, component placement and component combination of printed matter can be changed without changing the forms data group by changing only the component placement information, and hence the efficiency of the form change processing is improved.

Further, by associating components with printing data to be printed on the components, changes of printing data can be made unnecessary even if component placement in printed matter is changed. Therefore, printing data change processing attendant upon a change in component placement can be easily coped with. Since all components used in a plurality of combined forms data can be included in one forms data group without over-lapping, there is obtained the effect of reducing the forms data capacity of the printing control apparatus and of using storages efficiently.

We claim:

1. A printing control method combining print data and form data and outputting the thus combined data, the method comprising the steps of:
    a) dividing the form data into respective component data which are unit elements constituting the form data;
    b) storing said respective component data thus divided in a memory;
    c) storing in said memory form data generating information, which includes component identification data and component allocation information for each page, said component identification information being information for identifying one or more component data to be used as form data for a page and said component allocation information being information for indicating where said component data are to be allocated or placed onto the page;
    d) reading from memory, in response to a designation by form data generating information, component data indicated by component identification information, contained in said form data generating information;
    e) generating form data for one page by allocating or placing said component data onto said one page in accordance with component allocation information contained in said form data generating information; and
    f) combining said form data generated and said printing data together and outputting the combined data.

2. The method according to claim 1, wherein said component allocation information includes component placement information for indicating intra-page positions of components and said step e) of generating form data includes allocating or placing the components onto the page in accordance with the component placement information.

3. The method according to claim 1, wherein said component allocation information includes a factor of magnifying/reducing component data and the step e) of generating form data includes allocating said component data after effecting a process of magnifying/reducing said component data in accordance with said magnifying/reducing factor.

4. The method according to claim 1, wherein said component allocation information includes information specifying an angle of rotation of component data and said step e) of generating form data includes allocating said component data after rotating said component data in accordance with said rotation angle information.

5. The method according to claim 1, wherein said print data includes a piece of print data which is stored in association with a corresponding component data among component data contained in form data generating information specified at the time of printing and the step f) of combining form data and print data includes combining said piece od print data stored in association with said corresponding component data with said corresponding component data within the printing area of said corresponding component data.

6. The method according to claim 1, wherein said print data includes a piece of print data which contains print position specifying data for specifying a position in the page at which printing is to take place and that said step f) of combining form data and print data includes combining said piece of print data with the form data at said position indicated by said piece of print data.

7. The method according to claim 1, wherein aid designation by form data generating information includes information regarding the number of copy sheets onto which form data are to be printed successively for each form data and said step e) of generating form data includes generating the form data by the designated number of copy sheets successively.

8. An apparatus for combining print data and form data and for printing the thus combined data, said apparatus comprising:
    a) a forms data group storage storing a forms data group received from an external device, which forms data group includes component data and component placement information;
    b) a printing data storage storing printing data received from an external device, which printing data includes component placement selection information and variable data;

c) an intermediate processing buffer being coupled to the forms data group storage and the printing data storage, selecting component placement information from the forms data group storage based on the component placement selection information in the printing data storage, selects component data for a page to be printed, and stores the component placement information and component data as a combined forms data for the page to be printed;

d) a character pattern storage storing dot patterns representing character data; and e) a page data storage being coupled to the printing data storage, the intermediate processing buffer, and the character pattern storage, combining the combined forms data with the variable data into page data, converting the page data into dot pattern data based on dot patterns received from the character pattern storage.

9. The apparatus according to claim 8, wherein said component allocation information includes component placement information for indicating intra-page positions of components and further comprising means for allocating the components onto the page in accordance with the component placement information.

10. The apparatus according to claim 8, wherein said component allocation information includes a factor of magnifying/reducing component data and further comprising means for allocating said component data after effecting a process of magnifying/reducing said component data in accordance with said magnifying/reducing factor.

11. The apparatus according to claim 8, wherein said component allocation information includes information specifying an angle of rotation of component data and further comprising means for allocating said component data after rotating said component data in accordance with said rotation angle information.

12. The apparatus according to claim 8, wherein said print data includes a piece of print data which is stored in association with a corresponding component data among component data contained in form data generating information specified at the time of printing and said page data storage further comprises means for combining said piece of print data stored in association with said corresponding component data with said corresponding component data within the printing area of said corresponding component data.

* * * * *

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 1 | 20 | Change "a partial forth" to --partial form--. |
| 1 | 47 | After "with" insert --changes--. |
| 1 | 52 | Change "fortes" to --forms--. |
| 1 | 66 | Change "Still" to --Yet--. |
| 2 | 9 | Delete "may". |
| 2 | 35 | Change "foiled" to --formed--. |
| 3 | 27 | After "data" change "a" to --a--. |
| 3 | 29 | Change "variable a" to --variable data a--. |
| 3 | 39 | Before "drawings" insert --the--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 3 | 58 | Before "component" insert --group of--. |
| 3 | 59 | Change "group 3" to --pieces 3--. |
| 3 | 62 | Before "component" insert --group of--. |
| 3 | 63 | Change "group 3" to --pieces 3--. |
| 4 | 2 | After "pieces" insert --3--. |
| 4 | 30 | Change "printing data 5" to --printing data 4--. |
| 4 | 51 | Change "forth" to --form--. |
| 4 | 65 | Change "pieces" to --pieces 3--. |
| 4 | 67 | Change "pieces" to --pieces 3--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 5 | 1 | Change "pieces" to --pieces 3--. |
| 5 | 3 | After "information I" delete "to" and insert --, the component placement information II, and--. |
| 5 | 56 | Change "data 27" to --data 28--. |
| 8 | 19 | Change "fortes" to --forms--. |
| 8 | 24 | Change "and number" to --the number--. |
| 8 | 31 | After "buffer" insert --54--. |
| 8 | 43 | After "buffer" insert --54--. |
| 9 | 6 | After "data" insert --generation--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|--------|------|---|
| 9 | 7 | Change "buffer" to --buffer 54--. |
| 9 | 11 | Change "storage" to --storage 52--. |
| 9 | 30 | Change "forth" to --form--. |
| 9 | 50 | Change "data a" to --data $a$--. |
| 9 | 52 | Change "data a" to --data $a$--. |
| 9 | 65 | Change "data a" to --data $a$--. |
| 10 | 12 | Change "info,nation" to --information--. |
| 10 | 15 | Change "data a" to --data $a$--. |
| 10 | 18 | Change "data a" to --data $a$--. |
| 10 | 21 | Change "data a" to --data $a$--. |

UNITED STATES PATENT AND TRADEMARK OFFICE
CERTIFICATE OF CORRECTION

PATENT NO. : 5,379,368

DATED : 3 January 1995

INVENTOR(S) : Tuneo IMAI et al.

It is certified that error appears in the above-indentified patent and that said Letters Patent is hereby corrected as shown below:

| Column | Line | |
|---|---|---|
| 10 | 22 | Change "data a" to —data a—. |
| 10 | 23 | Change "variable a" to —variable a—. |
| 10 | 30 | Change "data a" to —data a—. |
| 10 | 34 | Change "data a" to —data a—. |
| 12 | 40 | Change "of" to —of—. |
| 12 | 51 | Change "aid" to —said—. |

Signed and Sealed this

Sixteenth Day of January, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,379,368          Page 1 of 5
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 1 | 20 | Change "a partial forth" to --partial form--. |
| 1 | 47 | After "with" insert --changes--. |
| 1 | 52 | Change "fortes" to --forms--. |
| 1 | 66 | Change "Still" to --Yet--. |
| 2 | 9 | Delete "may". |
| 2 | 35 | Change "foiled" to --formed--. |
| 3 | 27 | After "data" change "a" to --a--. |
| 3 | 29 | Change "variable a" to --variable data a--. |
| 3 | 39 | Before "drawings" insert --the--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 3 | 58 | Before "component" insert --group of--. |
| 3 | 59 | Change "group 3" to --pieces 3--. |
| 3 | 62 | Before "component" insert --group of--. |
| 3 | 63 | Change "group 3" to --pieces 3--. |
| 4 | 2 | After "pieces" insert --3--. |
| 4 | 30 | Change "printing data 5" to --printing data 4--. |
| 4 | 51 | Change "forth" to --form--. |
| 4 | 65 | Change "pieces" to --pieces 3--. |
| 4 | 67 | Change "pieces" to --pieces 3--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 5 | 1 | Change "pieces" to --pièces 3--. |
| 5 | 3 | After "information I" delete "to" and insert --, the component placement information II, and--. |
| 5 | 56 | Change "data 27" to --data 28--. |
| 8 | 19 | Change "fortes" to --forms--. |
| 8 | 24 | Change "and number" to --the number--. |
| 8 | 31 | After "buffer" insert --54--. |
| 8 | 43 | After "buffer" insert --54--. |
| 9 | 6 | After "data" insert --generation--. |

UNITED STATES PATENT AND TRADEMARK OFFICE
CERTIFICATE OF CORRECTION

PATENT NO. : 5,379,368
DATED : 3 January 1995
INVENTOR(S) : Tuneo IMAI et al.

It is certified that error appears in the above-indentified patent and that said Letters Patent is hereby corrected as shown below:

| Column | Line | |
|---|---|---|
| 9 | 7 | Change "buffer" to --buffer 54--. |
| 9 | 11 | Change "storage" to --storage 52--. |
| 9 | 30 | Change "forth" to --form--. |
| 9 | 50 | Change "data a" to --data $a$--. |
| 9 | 52 | Change "data a" to --data $a$--. |
| 9 | 65 | Change "data a" to --data $a$--. |
| 10 | 12 | Change "info,nation" to --information--. |
| 10 | 15 | Change "data a" to --data $a$--. |
| 10 | 18 | Change "data a" to --data $a$--. |
| 10 | 21 | Change "data a" to --data $a$--. |

UNITED STATES PATENT AND TRADEMARK OFFICE
CERTIFICATE OF CORRECTION

PATENT : 5,379,368
DATED : 3 January 1995
INVENTOR(S) : Tuneo IMAI et al.

It is certified that error appears in the above-identified patent and that said Letters Patent is hereby corrected as shown below:

| Column | Line | |
|---|---|---|
| 10 | 22 | Change "data a" to --data $a$--. |
| 10 | 25 | Change "variable a" to variable $a$--. |
| 10 | 30 | Change "data a" to --data $a$--. |
| 10 | 34 | Change "data a" to --data $a$--. |
| 12 | 40 | Change "od" to --of--. |
| 12 | 51 | Change "aid" to --said--. |

This certificate supersedes Certificate of Correction issued January 16, 1996.

Signed and Sealed this

Nineteenth Day of March, 1996

Attest:

BRUCE LEHMAN

*Attesting Officer*  *Commissioner of Patents and Trademarks*